United States Patent [19]

Okada et al.

[11] 4,208,312
[45] Jun. 17, 1980

[54] CURABLE ORGANOPOLYSILOXANE COMPOSITIONS

[75] Inventors: Fumio Okada, Takasaki; Hirofumi Kishita; Naomi Sato, both of Annaka, all of Japan

[73] Assignee: Shin-Etsu Chemical Co. Ltd., Tokyo, Japan

[21] Appl. No.: 946,171

[22] Filed: Sep. 27, 1978

[30] Foreign Application Priority Data

Sep. 30, 1977 [JP] Japan ............................ 52-117572

[51] Int. Cl.$^2$ ............................................. C08J 3/00
[52] U.S. Cl. ............................ 260/29.2 M; 260/18 S; 427/411; 427/412.2; 428/447; 528/12; 528/14; 528/15; 528/17; 528/18; 528/33; 528/34; 528/31
[58] Field of Search ................ 260/29.2 M, 18 S; 528/15, 18, 14, 17, 12, 33, 34, 31

[56] References Cited

U.S. PATENT DOCUMENTS

| | | | |
|---|---|---|---|
| 3,960,786 | 6/1976 | Akiyama | 528/31 |
| 4,008,346 | 2/1977 | Moeller | 528/31 |
| 4,026,843 | 5/1977 | Kittle et al. | 528/31 |
| 4,026,844 | 5/1977 | Kittle et al. | 528/31 |

*Primary Examiner*—Melvyn I. Marquis
*Attorney, Agent, or Firm*—Toren, McGeady and Stanger

[57] ABSTRACT

Organopolysiloxane compositions are provided which are curable by condensation reaction taking place between a first component, hydroxy-terminated diorganopolysiloxane and a second component, organohydrogenpolysiloxane by aid of a third component, a condensation catalyst, and which are made to have their pot life extended by adding a fourth component, acyloxysilane, optionally in combination with a carboxylic acid, as a condensation retarder. The addition of the retarder does not adversely effect the curing velocity of the composition even at an elevated temperature and the properties of the cured composition.

5 Claims, No Drawings

CURABLE ORGANOPOLYSILOXANE COMPOSITIONS

BACKGROUND OF THE INVENTION

The present invention relates to an organopolysiloxane composition curable by condensation reaction or, in particular, to an organopolysiloxane composition curable by condensation reaction with extended pot life.

The condensation reaction between organopolysiloxanes is a well known reaction and widely utilized in preparing various kinds of silicone products. The products by the condensation reaction are used as intermediate compounds for the preparation of various kinds of products with complicated structures or used per se as final objective products of value. For example, they are used as a mold release agent or a coating material on a release paper. When the intended use of these organopolysiloxane compositions is in the preparation of a release paper, they are put to use by adding a catalyst for accelerating the condensation reaction. The catalyst-added organopolysiloxane composition has desirably a sufficiently long pot life at room temperature. In other words, the velocity of the crosslink formation in the composition by the condensation reaction should be as low as possible at room temperature after admixing of the condensation catalyst. On the other hand, the curing velocity of the catalyst-added organopolysiloxane composition must be sufficiently large at an elevated temperature to give good productivity in the production process by use of the composition.

In recent years, there is known an organopolysiloxane composition curable by condensation reaction with improved curing velocity but such a type of the composition suffers from shortened pot life. The requirements for the pot life as long as possible and for the large curing velocity cannot be compatible with each other because an extended pot life is obtained only in the sacrifice of the curing velocity. This problem of undesirably short pot life is especially difficult to solve in an organopolysiloxane composition in which the condensation reaction takes place by the dehydrogenation reaction between silicon-bonded hydroxy groups and silicon-bonded hydrogen atoms among various types of the condensation reactions including dehydration condensation between silicon-bonded hydroxy groups, dealcoholation condensation between silicon-bonded hydroxy groups and silicon-bonded alkoxy groups and de(carboxylic acid) condensation between silicon-bonded hydroxy groups and silicon-bonded acyloxy groups and the like.

Therefore it has been a generally accepted practice that the extension of the pot life is achieved by the dilution of the organopolysiloxane composition having large curing velocity with large volume of an organic solvent. As a trend in recent years, however, the amount of an organic solvent to be added to such a composition is limited further and further from the standpoint of toxicity against human body, danger of fire or explosion and the problem of air pollution as well as from the standpoint of saving of natural resources. Thus it is eagerly desired to develop an organopolysiloxane composition having sufficiently extended pot life along with no influence on the curing velocity and on the properties of the composition after curing by use of a minimum volume of an organic solvent.

Besides the organopolysiloxane compositions curable by condensation reaction, on the other hand, there is known another type of organopolysiloxane compositions curable by addition reaction. For this type of organopolysiloxane compositions, several kinds of effective reaction retarders are proposed such as acetylenic compounds as a result of investigations and they are widely utilized industrially.

Unfortunately, no reaction retarders are known for the organopolysiloxane compositions curable by condensation reaction with exception of acetic acid and the like with only limited effects (see Japanese Patent Publication SHO 38-13913) necessitating to recur to the use of large volumes of organic solvents to dilute the composition. In addition, the method relying on acetic and the like is inapplicable to the organopolysiloxane compositions used in a high solid concentration or as solvent-free and it is also inapplicable to the organopolysiloxane compositions used in the form of an aqueous emulsion since such an additive is sometimes harmful to the stability of the aqueous emulsion.

In addition, the curable organopolysiloxane compositions of the above described type have a problem that, when used as a coating agent on release papers, the coating and heat-curing steps of the composition must follow as soon as possible the admixing of the curing catalyst into the composition because a delay in the coating and heat-curing sometimes leads to undesirable increase in the peeling resistance of the finished release paper products to such an extent as inapplicable to practical use.

In short, the conventional reaction retarders described above have very little effectiveness in retarding the condensation reaction and are hardly applicable to the organopolysiloxane compositions of high-solid type or aqueous emulsion type.

SUMMARY OF THE INVENTION

It is therefore an object of the present invention to present a reaction retarder applicable to various types of organopolysiloxane compositions curable by the mechanism of condensation reaction, in particular, by the mechanism of dehydrogenation very effective even in a small amount of addition without a danger of destroying aqueous emulsions and having no adverse effects on the curing velocity of the composition when put to use as well as on the properties of the cured composition such as the mechanical strengths of the films formed thereof and the releasability of the surface.

The present invention completed as a result of the inventors' extensive investigations relates to an organopolysiloxane composition formulated with the addition of a reaction retarder to satisfy the above requirements and the organopolysiloxane composition of the invention comprises (a) 100 parts by weight of a diorganopolysiloxane terminated at both chain ends with hydroxy groups directly bonded to the silicon atoms, (b) from 0.1 to 50 parts by weight of an organohydrogenpolysiloxane having, in a molecule, at least three hydrogen atoms directly bonded to the silicon atoms, (c) from 1 to 20 parts by weight of a catalyst for condensation reaction, (d) from 5 to 80% by weight, based on the amount of the component (c) above, of an acyloxysilane compound represented by the general formula

　　　(I)

where $R^1$ and $R^2$ are each a monovalent hydrocarbon or halogenated hydrocarbon group having 1 to 18 carbon atoms, and (e) from zero to 50% by weight, based on the amount of the component (c) above, of a carboxylic acid represented by the general formula $$R^3COOH \qquad (II)$$

where $R^3$ is a monovalent hydrocarbon or halogenated hydrocarbon group having 1 to 6 carbon atoms.

DETAILED DESCRIPTION OF THE PREFERRED EMBODIMENTS

The organopolysiloxane composition of the present invention is now described below in further detail.

The component (a) which is the main ingredient of the inventive composition is a substantially linear diorganopolysiloxane expressed by the general formula

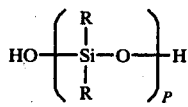

where R is a substituted or unsubstituted monovalent hydrocarbon group and P is a positive integer, terminated at both chain ends with hydroxy groups directly bonded to the silicon atoms. The group R is exemplified by alkyl groups such as methyl, ethyl and propyl groups; alkenyl groups such as vinyl and allyl groups; cycloalkyl groups; cycloalkenyl groups; aryl groups such as phenyl group; halogenated hydrocarbon groups; cyano-substituted hydrocarbon groups; cyano-substituted hydrocarbon groups; and the like. It is preferable that the diorganopolysiloxane as the component (a) has a viscosity of at least 10 centistokes at 25° C. in order that the cured product of the composition may have sufficiently high mechanical strengths.

Several of the examples of the diorganopolysiloxane suitable as the component (a) are shown by the following structural formulas, in which, and hereinafter, Me, Vi and Ph denote methyl, vinyl and phenyl groups, respectivly, and m and n are each a positive integer.

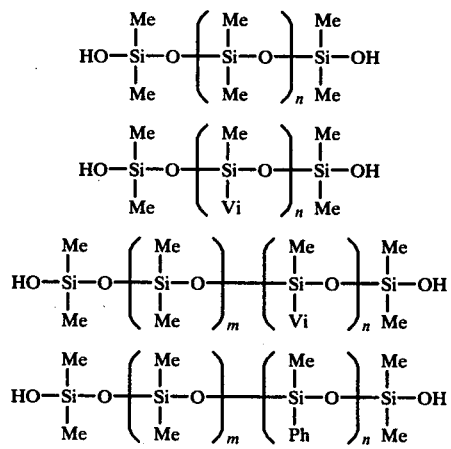

The second component (b) in the inventive composition serves as a crosslinking agent by the condensation reaction with the diorganopolysiloxane as the component (a) above and the organohydrogenpolysiloxane as the component (b) is expressed by the average unit formula

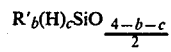

where R' has the same meaning as defined for R above and b and c are each a positive number with the proviso that $2 \leq b+c \leq 3$. In order that the component (b) serves as a crosslinking agent, the organohydrogenpolysiloxane should have at least three hydrogen atoms directly bonded to the silicon atoms in a molecule. The molecular configuration of the organohydrogenpolysiloxane is not limitative including linear chains, branched chains and cyclic rings in so far as it has at least three silicon-bonded hydrogen atoms in a molecule and it is also not limited rheologically including oily fluids, gums and resins.

It is preferable that the organohydrogenpolysiloxane as the component (b) has a viscosity of at least 10 centistokes at 25° C. in order that the cured products of the composition may have sufficiently high mechanical strengths.

Typical examples of the organohydrogenpolysiloxane as the component (b) in the present invention are dimethylhydrogenpolysiloxanes having a linear molecular configuration of various degrees of polymerization terminated at both chain ends with trimethylsilyl groups or dimethylhydrogensilyl groups, copolymeric linear organohydrogenpolysiloxanes composed of diorganosiloxane units and monoorganohydrogen siloxane units and terminated with triorganosilyl groups or diorganohydrogensilyl groups at the chain ends with various degrees of polymerization and copolymeric branched-chain organohydrogenpolysiloxanes composed of the siloxane units of $SiO_2$ and $R_2HSiO_{0.5}$ units, where R is the same as defined above, including tetrakis(dimethylhydrogensiloxay)silane expressed by the structural formula $Si(-OSiMe_2H)_4$ and those having complicated molecular structures.

The amount of the component (b) to be formulated in the inventive composition is in the range from 0.1 to 50 parts by weight or, preferably, from 0.5 to 20 parts by weight per 100 parts by weight of the component (a) since smaller amounts of the component (b) than above result in insufficient cure of the composition while excessive amounts of the component (b) over the above range give no particular advantages with only economical disadvantages.

The condensation catalyst as the component (c) in the inventive composition may be a conventional one with no specific limitation used in the prior art compositions of the similar type as exemplified by dibutyltin dilaurate, dibutyltin dioctoate, dibutyltin diacetate, zinc octoate, tetrabutyl titanate, iron stearate, lead octoate and the like.

The amount of the condensation catalyst as the component (c) is preferably in the range from 1 to 20 parts by weight per 100 parts by weight of the component (a) since smaller amounts than above result in insufficient curing of the inventive composition while excessive amounts over the above range give no particular advantages.

The components (d) and (e) serves to impart sufficient pot life to the inventive composition and the component (d) is an acyloxysilane represented by the general formula (I) above, in which $R^1$ and $R^2$ in the formula are each a monovalent hydrocarbon group or halogenated hydrocarbon group with 1-18 carbon atoms exemplified by alkyl groups such as methyl, ethyl, propyl, octyl, undecyl, heptadecyl and octadecyl groups; alkenyl groups such as vinyl and allyl groups; aryl groups such as phenyl groups; and those groups having one or more of halogen atoms, e.g. chlorine or fluorine atoms, in substitution of the hydrogen atoms in the above named hydrocarbon groups such as chloromethyl, trichloroethyl, perfluoropropyl, perfluorovinyl groups and the like.

Several of the examples of the acyloxysilanes suitable for use as the component (d) in the inventive composition are shown by the formulas given below, in which, and hereinafter, Pr denotes a propyl group.

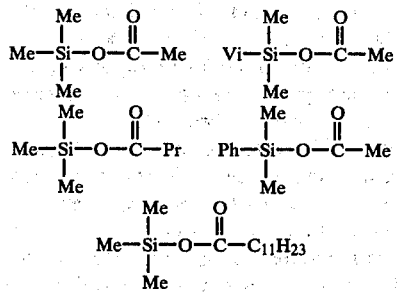

These acyloxysilanes are readily prepared by the well known synthetic methods. For example, the method for the synthesis of trimethylacetoxysilane is described in Journal of the American Chemical Society, Vol. 69, page 2110 (1947).

In the above given general formula (II) representing the carboxylic acid as the component (e), $R^3$ is a monovalent hydrocarbon or halogenated hydrocarbon group having 1 to 6 carbon atoms as exemplified by alkyl groups such as methyl, ethyl, propyl, butyl and hexyl groups; cycloalkyl groups such as cyclohexyl group; alkenyl groups such as vinyl and allyl groups; aryl groups such as phenyl group, and those groups having one or more of halogen atoms, e.g. chlorine or fluorine atoms, in substitution of the hydrogen atoms in the above named hydrocarbon groups such as chloromethyl, trichloroethyl, perfluoropropyl and perfluorovinyl groups.

Several of the examples of the carboxylic acids as the component (e) in the inventive composition are acetic acid, propionic acid, n-butyric acid, benzoic acid, dichloroacetic acid, trichloroacetic acid, trifluoroacetic acid and the like.

The amounts of the acyloxysilane as the component (d) and the carboxylic acid as the component (e) are preferably in the ranges from 5 to 80% by weight and up to 50% by weight, respectively, each based on the amount of the component (c). When the amount of the acyloxysilane is smaller than the above, the pot life of the resultant composition cannot be extended sufficiently while larger amounts of the acyloxysilane than above result in an excessively high effect of retarding the reaction and, consequently, in an undesirably slow curing velocity or almost no curing. It has been found that the pot life of the composition as defined below reaches a maximum with a suitable amount of the acyloxysilane and decreases by further increase of the amount of the acyloxysilane while the curing velocity decreases steadily with the increase of the amount of the acyloxysilane. The pot life of the compositions can be extended sufficiently by the use of the above specified amount of the component (d) but the combined use of the component (e) with the component (d) gives further enhanced effect of pot life extension although an excessively large amount of the component (e) over 50% by weight based on the component (c) leads to the same disadvantages as with too large amounts of the component (d).

The organopolysiloxane composition of the present invention can be prepared by merely blending the components (a) to (e) uniformly and the composition is readily cured by heating at an elevated temperature to give cured products, such as a coating film on a release paper, with excellent properties not affected by the addition of the components (d) and (e) while the velocity of curing at room temperature is very low with sufficiently extended pot life of the composition.

It is optional that the composition of the present invention is used as dispersed in or diluted with an organic solvent according to need and the organic solvent suitable for such a purpose is exemplified by toluene, xylene, methylethylketone, technical grade gasoline and the like.

The present invention presents a means to almost completely solve the problems in the prior art methods of pot life extension of the organopolysiloxane compositions curable by condensation reaction such as the addition of a large volume of organic solvents or the use of acetic acid and the like. The largest advantage obtained by the present invention is that the effect of the extension of the pot life is very high so that the pot life of the inventive composition is several times or even several tens of times longer than in the similar compositions of the prior art contributing to the reduction of the number of preparations of the ready-mixed compositions and to the stable running of the machines over a long period of time for the process using the organopolysiloxane composition. Further, as a result of the very remarkable effectiveness of pot life extension obtained in the inventive compositions, the retarder components (d) and (e) are used in so small amounts that these components have almost no influence on the concentration of the composition with consequent applicability to the high-solid compositions or solvent-free compositions by complete elimination or reduction of the necessity of the troublesome use of organic solvents. This advantage is very great from the standpoint of preventing environmental pollution and decreasing the danger of fire or explosion as well as from the standpoint of saving of natural resources.

The second advantage obtained by the present invention is that no adverse effects are given on the properties of the films of the cured organopolysiloxane composition unless too much amount of the component (d) is used. This means that the pot life of the composition can be sufficiently extended with no adverse effects on the heat-curability, peeling resistance and residual adhesiveness when used as a coating material on release papers and the adhesion and the mold releasability when used as a releasing agent.

The third advantage obtained by the present invention is that the principle of the inventive composition is applicable also to the organopolysiloxane compositions of aqueous emulsion type. In an organopolysiloxane composition of aqueous emulsion type used as a coating material on release papers, for example, the retarder components may be admixed in the aqueous medium or in the so-called self-emulsifiable catalyst mix to exhibit the retarding effect on the condensation reaction. Thus a possibility is given of the extension of the pot life of aqueous emulsion type organopolysiloxane compositions hitherto considered as almost impossible.

It is also noteworthy that the addition of the acyloxysilane as the component (d) brings about an unexpected advantage in the manufacturing process of release papers since, different from the conventional organopolysiloxanes of similar types, no adverse effects are given on the peeling resistance of the release paper products even with a delay in the coating and heat-curing of the composition up to 24 hours or longer after admixing of the curing catalyst into the composition.

Further an additional advantage is obtained in that the principle of retardation of the present invention is applicable regardless of the types of the catalysts or catalyst systems. For example, the condensation catalyst formulated in the inventive compositions may be any one of dibutyltin dioctoate, dibutyltin diacetate, zinc octoate, tetrabutyl titanate and the like.

In addition, the established interrelationship between the amounts of the retarder components and the pot life of the composition permits the adequate control of the curing time of the organopolysiloxane rubbers and the like by using an appropriate amount of the retarder components.

As is understood by the description above given, the compositions of the present invention may include those silicone products of not only solution types but also products of aqueous emulsion types and solvent-free products.

Following examples are given to illustrate the present invention in further detail, in which parts are all given by parts by weight and the values of viscosity are those measured at 25° C. unless otherwise mentioned.

The procedures for the determination of the pot life, peeling resistance and residual adhesiveness are as follows.

Pot life

The composition after admixing of the metal salt of an organic acid as the curing catalyst was kept for a length of time and then applied evenly to the surface of a polyethylene-laminated paper in a coating amount of 0.8 g/m² as organopolysiloxane. The thus obtained coated paper was heated in an air oven at 180° C. for 30 seconds to cure the organopolysiloxane composition to determine the longest time of standing, i.e. pot life, from the admixing of the catalyst to the coating of the paper with the composition capable of giving a curable coating layer. Whether or not the coating layer had been cured by heating was determined by rubbing the surface of the coating layer with a finger tip and, if the coating layer was readily removed by this rubbing test, it was recorded as uncured. When the composition became gelled to such an extent that the coating therewith was no longer possible, the time to the gellation was recorded as the pot life.

Peeling resistance

A polyethylene-laminated paper coated with the organopolysiloxane composition was heated in an air oven at 180° C. for 30 seconds to cure the composition into a coating layer of about 0.8 g/m² as organopolysiloxane. After standing at 23° C. for 24 hours in an atmosphere with a relative humidity of 65%, the thus obtained coated paper was further coated with a pressure-sensitive acrylic adhesive of solution type BPS-5127 (product of Toyo Ink Seizo Co., Japan) in a coating amount of about 130 μm thickness and kept at 23° C. for 15 minutes for drying. Then a paper for recorder chart was laid on the adhesive surface and adhesively bonded by pressing with a roller weighing 2 kg which was moved once to the right and left on the paper followed by keeping at 23° C. for 3 hours in an atmosphere with a relative humidity of 65%. The thus bonded paper was peeled at a speed of 30 mm/minute in the 180° C. direction to determine the resistance against peeling which was recorded in grams per 5 cm.

Residual adhesiveness (by tape method)

A polyethylene-laminated paper was coated with the organopolysiloxane composition in the same manner as in the test for peeling resistance above described and kept at 23° C. for 24 hours in an atmosphere with a relative humidity of 65%. An adhesive tape, Scotch Tape No. 28 (product of Minesota Mining & Manufacturing Co.) of ½ inch width was attached to the silicone-coated surface and bonded by pressing with a load of 20 g/cm² for 20 hours at 70° C. and then kept at 23° C. for 4 hours in an atmosphere with a relative humidity of 65%. Then the adhesive tape was taken by peeling and attached again on to the surface of a stainless steel plate by pressing with a roller weighing 2 kg which was moved once to the right and left. After keeping at 23° C. for 30 minutes in an atmosphere with a relative humidity of 65%, the adhesive tape was peeled at a speed of 30 mm/minute in the 180° direction and the resistance against peeling was recorded.

The above obtained value of the peeling resistance was compared with the reference value, which was obtained with the same tape but taken from the surface of a plate of polytetrafluoroethylene resin instead of the silicone-coated surface, the other conditions of the procedure being the same as in the above, and expressed in percentages to be recorded as the value of the residual adhesiveness.

Example 1

A curable composition was prepared by uniformly blending 49.5 parts of a dimethylpolysiloxane terminated at both chain ends with hydroxy groups and having a viscosity of 700 centistokes, 0.5 part of a methylhydrogenpolysiloxane expressed by the structural formula

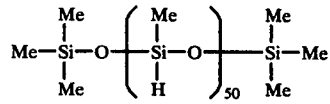

having a viscosity of 20 centistokes, 50 parts of toluene and 5 parts of dibutyltin diacetate. The pot life of this compostion at 25° C. was about 20 minutes.

Into the composition prepared in the same formulation as above were added trimethylacetoxysilane and trichloracetic acid in amounts varied as indicated in Table 1 below and the pot life of the composition was examined to give the results as set out in the same table. As is evident from the table, remarkable extension of the pot life was achieved by the addition of trimethylacetoxysilane and trichloroacetic acid.

Table 1

| Trimethylacetoxy-silane, parts | Trichloroacetic acid, parts | Pot life, minutes |
|---|---|---|
| 0 | 0 | 20 |
| 2.5 | 0.20 | 150 |
| 2.5 | 0.24 | 250 |
| 0.7 | 1.20 | 360 |

Example 2

A curable composition was prepared by uniformly blending 43 parts of a dimethylpolysiloxane terminated at both chain ends with hydroxy groups and having a viscosity of 600 centistokes, 7 parts of a methylhydrogenpolysiloxane expressed by the structural formula

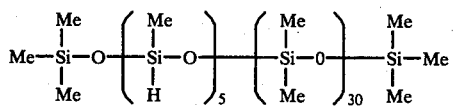

having a viscosity of 15 centistokes, 40 parts of technical grade gasoline and 5 parts of dibutyltin dioctoate. The pot life of this composition was about 50 minutes at 25° C.

Into the composition prepared in the same formulation as above were added trimethylacetoxysilane and acetic acid in amounts varied as indicated in Table 2 below and the pot life of the composition was examined to give the results as set out in the same table. As is evident from the table, remarkable extension of the pot life is achieved by the addition of trimethylacetoxysilane and acetic acid.

Table 2

| Trimethylacetoxy-silane, parts | Acetic acid, parts | Pot life, minutes |
|---|---|---|
| 0 | 0 | 50 |
| 5 | 0 | 170 |
| 5 | 1 | 300 |

EXAMPLE 3

Curable compositions were prepared in the same formulation as in Example 2 except that the trimethylacetoxysilane and acetic acid were replaced with 5 parts of an acyloxysilane and 1 part of a carboxylic acid as indicated in Table 3 below to give the values of the pot life at 25° C. as set out in the same table.

Table 3

| Acyloxysilane | Carboxylic acid | Pot life, minutes |
|---|---|---|
| Dimethylvinyl acetoxysilane | Acetic acid | 270 |
| Trimethylbutanoyloxysilane | Trichloroacetic acid | 360 |
| Dimethylphenyl acetoxysilane | Trifluoroacetic acid | 330 |
| Trimethyllauroyloxysilane | Trichloroacetic acid | 230 |
| Trimethylbutanoyloxysilane | Benzoic acid | 250 |

EXAMPLE 4

An aqueous emulsion of an organopolysiloxane curable by condensation reaction was prepared by uniformly blending 9 parts of a dimethylpolysiloxane terminated at both chain ends with hydroxy groups and having a viscosity of 2,000 centistokes, 1 part of the same methylhydrogenpolysiloxane as used in Example 2, 5 parts of toluene, 1 part of a nonionic surface active agent Newcol 131C (product of Nippon Emulsifier Co.), 81 parts of water and 0.1 part of acetic acid.

On the other hand, a self-emulsifiable catalyst mix was prepared by uniformly blending 1 part of dibutyltin dioctoate, 1 part of toluene and 1 part of the same nonionic surface active agent as above.

A silicone emulsion for release paper coating was prepared by uniformly blending the above prepared organopolysiloxane emulsion and the catalyst mix and found to have a pot life of about 20 minutes at 25° C.

Five other silicone emulsions for release paper coating were prepared in the same formulation as above except that the catalyst mixes were admixed in advance with trimethylacetoxysilane in varied amounts as indicated in Table 4 below, in which the values of the pot life at 25° C. are also given. The values of the peeling resistance and the residual adhesiveness were determined after 1, 3, 5 or 24 hours of keeping of the emulsions after admixing of the catalyst mix and the results are set out in Table 4.

Table 4

| Emulsion No. | Trimethylacetoxy silane, parts | Pot life, hours | Peeling resistance in g/5 cm determined after: | | | | Residual adhesiveness in % determined after: | | | |
|---|---|---|---|---|---|---|---|---|---|---|
| | | | 1 hr. | 3 hrs. | 5 hrs. | 24 hrs. | 1 hr. | 3 hrs. | 5 hrs. | 24 hrs. |
| 1 | 0 | 2 | 26 | 147 | 200 | 220 | 87 | 94 | 95 | 94 |
| 2 | 0.12 | 5 | 18 | 14 | 18 | 185 | 87 | 92 | 93 | 92 |
| 3 | 0.24 | 24 | 23 | 12 | 16 | 27 | 88 | 90 | 91 | 90 |
| 4 | 0.34 | 72 | 20 | 13 | 20 | 20 | 87 | 90 | 90 | 88 |
| 5 | 0.42 | 24 | 19 | 16 | 21 | 22 | 87 | 88 | 80 | 81 |
| 6 | 0.60 | 24 | 20 | 17 | 22 | 21 | 86 | 87 | 81 | 80 |

EXAMPLE 5

A curable composition was prepared by uniformly blending 100 parts of a dimethylpolysiloxane terminated at both chain ends with hydroxy groups and having a viscosity of 1,000 centistokes, 0.6 part of a methylhydrogenpolysiloxane expressed by the structural formula

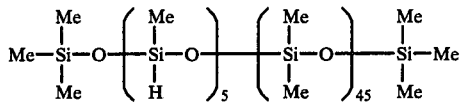

having a viscosity of 20 centistokes and 5 parts of dibutyltin diacetate. The pot life of this composition was about 33 minutes at 25° C.

Into the composition prepared in the same formulation as above were admixed trimethylacetoxysilane and trichloroacetic acid in varied amounts as indicated in Table 5 below and the pot life of these compositions was examined to give the results as set out in the same table.

Table 5

| Trimethylacetoxy-silane, parts | Trichloroacetic acid, parts | Pot life, minutes |
|---|---|---|
| 0 | 0 | 33 |
| 0 | 1.5 | 53 |
| 3.5 | 0 | 234 |
| 1.0 | 0.8 | 400 |

What is claimed is:

1. A curable organopolysiloxane composition consisting essentially of
    (a) 100 parts by weight of a diorganopolysiloxane terminated at both chain ends with hydroxy groups directly bonded to the silicon atoms,
    (b) from 0.1 to 50 parts by weight of an organohydrogenpolysiloxane having, in a molecule, at least three hydrogen atoms directly bonded to the silicon atoms,
    (c) from 1 to 20 parts by weight of a catalyst for condensation reaction,
    (d) from 5 to 80% by weight, based on the amount of the component (c) above, of an acyloxysilane represented by the general formula $R_3^1SiOCOR^2$ where $R^1$ and $R^2$ are each a monovalent hydrocarbon or halogenated hydrocarbon group having 1 to 18 carbon atoms, and
    (e) from zero to 50% by weight, based on the amount of the component (c) above, of a carboxylic acid represented by the general formula $R^3COOH$ where $R^3$ is a monovalent hydrocarbon or halogenated hydrocarbon group having 1 to 6 carbon atoms.

2. The curable organopolysiloxane composition as claimed in claim 1 wherein the amount of the component (b) is in the range from 0.5 to 20 parts by weight per 100 parts by weight of the component (a).

3. The curable organopolysiloxane composition as claimed in claim 1 wherein the component (d) is selected from the class consisting of trimethylacetoxysilane, dimethylvinylacetoxysilane, trimethylbutanoyloxysilane and dimethylphenylacetoxysilane.

4. The curable organopolysiloxane composition as claimed in claim 1 wherein the component (e) is selected from the class consisting of acetic acid, propionic acid, n-butyric acid, benzoic acid, trichloroacetic acid, dichloroacetic acid and trifluoroacetic acid.

5. The curable organopolysiloxane composition as claimed in claim 1 which is dispersed in an aqueous medium in the form of an aqueous emulsion.

* * * * *